Figure 1:
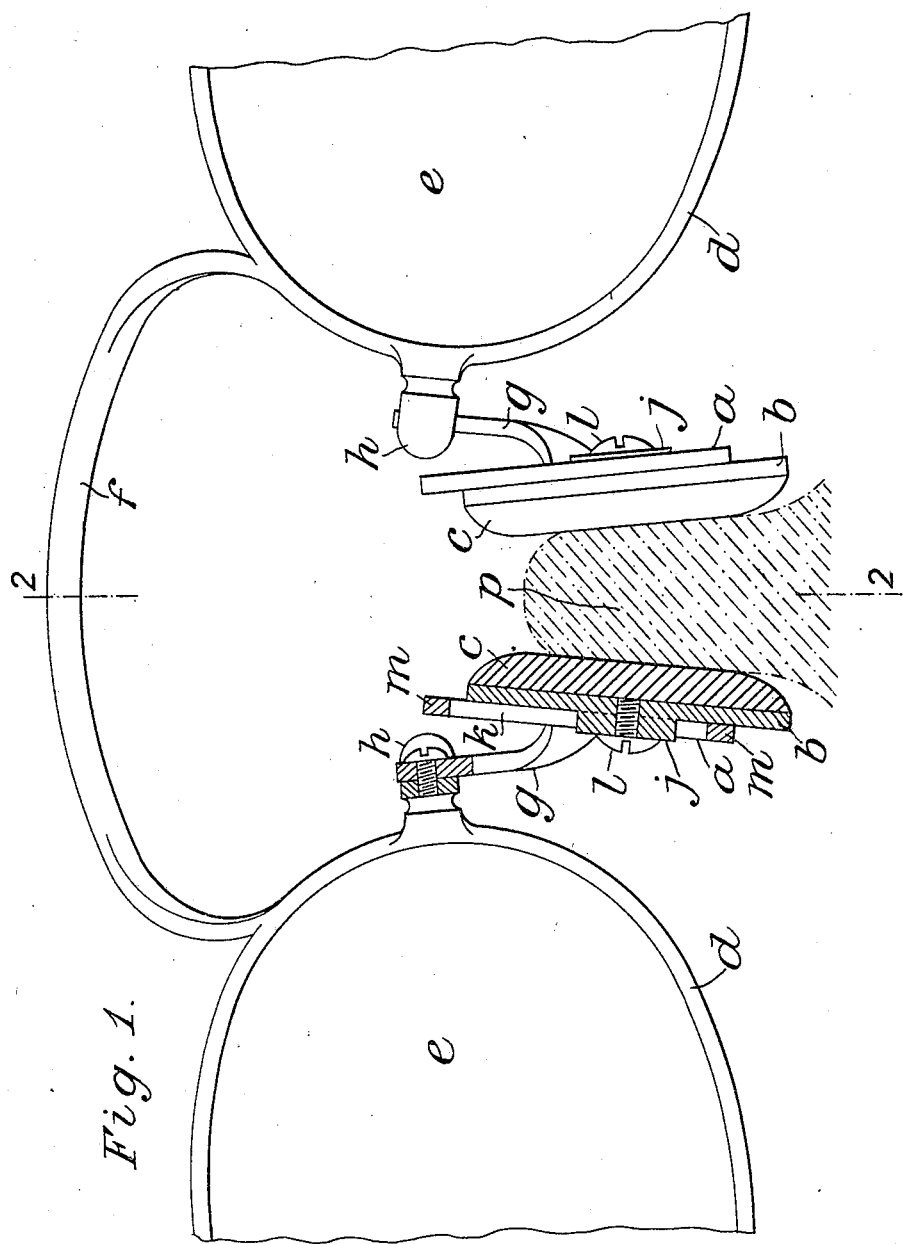

No. 837,081. PATENTED NOV. 27, 1906.
G. A. LAYTON.
EYEGLASSES.
APPLICATION FILED OCT. 10, 1904.

2 SHEETS—SHEET 1.

Witnesses
Frank Mellor

Inventor.
George Alfred Layton

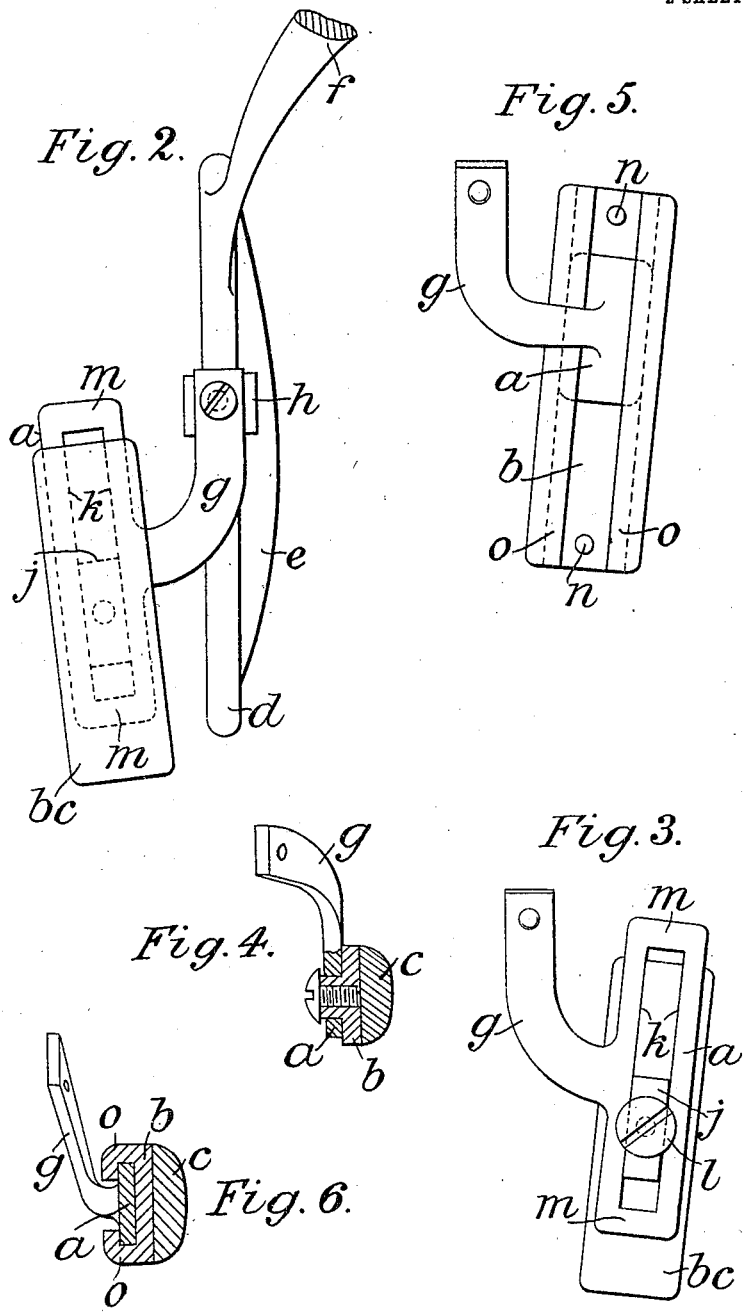

UNITED STATES PATENT OFFICE.

GEORGE ALFRED LAYTON, OF LONDON, ENGLAND.

EYEGLASSES.

No. 837,081. Specification of Letters Patent. Patented Nov. 27, 1906.

Application filed October 10, 1904. Serial No. 227,881.

*To all whom it may concern:*

Be it known that I, GEORGE ALFRED LAYTON, a British subject, residing at No. 1 Temple Gardens, London, in the county of Middlesex, England, have invented new and useful Eyeglasses or Pince-Nez, of which the following is a specification.

My invention relates to eyeglasses or pince-nez, and comprises an improved construction of plackets for the eyeglasses or pince-nez, each placket according to my invention consisting of two main portions, whereof the one is adapted to be attached to the frame or body of the instrument, while the other portion, constituting a pad, adapted to contact directly with the nose of the wearer, is so fitted to the first as to allow free sliding movement of the one portion relatively to the other in a direction approximately vertical—i. e., parallel to the general plane of the lenses. The bridge of the eyeglasses or pince-nez is preferably rigid, or nearly so, and the two plackets are so placed as to converge slightly toward one another in the upward direction, the arrangement being such that upon the instrument being placed upon the nose the pads will be arrested by contact with the nose and will remain stationary thereon, while the remainder of the instrument may be made to slide downward relatively to the pads until firmly set upon the nose in consequence of the wedge-like action of the nose relatively to the convergent plackets, but without appreciably altering the distance between the centers of the lenses.

The principal object of my invention is to enable the distance between the centers of the lenses to be maintained constant and at the same time to insure that the instrument shall be set with regard to the eyes uniformly in the same position. I attain this object by the mechanism illustrated in the accompanying drawings.

Figure 1 is an inside elevation, partly in section, of a pair of eyeglasses or pince-nez provided with plackets constructed according to my invention. Fig. 2 is a vertical section on line 2 2 of Fig. 1 looking toward the left-hand side. Fig. 3 shows separately an elevation of the placket shown in Fig. 2, but looking from the opposite direction. Fig. 4 is a plan view of the same placket, partly in section. Figs. 5 and 6 are similar views to Figs. 3 and 4, respectively, showing a slightly-varied mode of mounting the plackets.

All the views are drawn to an exaggerated scale.

Similar letters of reference denote corresponding parts in all the figures.

The invention as illustrated is used in connection with the well-known type of rim-glasses; but the invention may be used with rimless ones.

Each placket comprises a guide-bar $a$, which is so mounted as to be maintained stationary with relation to the lenses of the instrument and which extends in a direction tangential to the corresponding side of the nose of the wearer when the instrument is in position, the bars $a$ $a$ of the two plackets consequently converging slightly toward one another in the upward direction, as shown in Fig. 1.

On the guide-bars $a$ $a$ a pair of plates $b$ $b$ are mounted to slide freely in contact with the inner or mutually-opposed surfaces of the two guide-bars and in a direction approximately parallel to the general plane of the lenses, as indicated in Fig. 2, each plate $b$ being preferably of oblong shape, as indicated, and faced, as at $c$, with cork, tortoise-shell, or other material adapted to provide a suitable surface to contact with the nose.

The guide-bars $a$ $a$ are attached to the frame or body of the instrument, for which purpose each guide-bar $a$ may be formed upon or attached to one end of an arm or bracket $g$, whereof the other end is adapted to be secured to said frame or body. The form of attachment illustrated consists of a clip $h$ upon the support $d$ of each lens $e$, to which clip the end of the arm or bracket $g$ is made fast by means of a screw.

The sliding plates $b$ may be of various shapes or forms, and in order to guide and retain the sliding plates upon the guide-bars $a$ each plate $b$ may (as shown in Figs. 1 to 4) be provided at back with a die-block $j$, fitted to slide freely in a guide-slot $k$ in the bar $a$, a broad-headed screw $l$ or equivalent contrivance attached to the block $j$ serving to retain the block within the slot $k$, the closed ends $m$ $m$ of which limit the amount of relative sliding movement between the plate $b$ and bar $a$, or (as shown in Figs. 5 and 6) the lateral edges of each plate $b$ might be re-curved, as at $o$ $o$, to fit over and slide freely upon the parallel corresponding edges of the guide-bar $a$, the amount of sliding movement being limited by stops, such as $n\ n$, on the plate $b$.

When the eyeglasses or pince-nez are placed upon the nose and forced downward with a moderate degree of pressure, the padded plates $bc\ bc$ (which at the commencement of the operation should be in their lowest position relatively to the guide-bars $a\ a$) will be at once arrested by contact with the nose (indicated by the dotted lines at $p$ in Fig. 1) and will in consequence of the relative sliding movement permitted between the plates $bc\ bc$ and the guide-bars $a\ a$, permit the remainder of the instrument to be moved downward until firmly set upon the nose in consequence of the wedge-like action of the latter, the distance between the centers of the lenses $e\ e$ remaining almost or entirely unaffected in consequence of the rigidity of the bridge $f$.

What I claim, and desire to secure by Letters Patent of the United States, is—

1. The combination, with an eyeglass-frame, of a guide-bar secured thereto, a nose-piece mounted on the inner surface of said guide-bar and having free sliding connection with said guide-bar and means which prevent said nose-piece from turning for the purpose specified.

2. The combination, with an eyeglass-frame having a rigid bridge-piece, of a guide-bar secured thereto, a nose-piece mounted on the inner surface of said guide-bar and having substantially vertical free sliding connection with said guide-bar and means which prevent said nose-piece from turning for the purpose specified.

3. The combination, with an eyeglass-frame, of a guide-bar secured thereto so as to be maintained stationary with relation to the lenses; and a nose-piece having rebent lateral edges embracing the edges of said guide-bar, whereby said nose-piece has free sliding connection with said guide-bar in a direction approximately vertical, for the purpose specified, and stops on said nose-piece to limit its movement on the guide-bar.

In testimony whereof I have signed my name to this specification in the presence of two subscribing witnesses.

GEORGE ALFRED LAYTON.

Witnesses:
 FRANK MELLOR,
 BENJAMIN STOKES.